(12) United States Patent
Matsunaga et al.

(10) Patent No.: US 7,184,868 B2
(45) Date of Patent: Feb. 27, 2007

(54) VEHICLE DYNAMICS BEHAVIOR REPRODUCTION SYSTEM

(75) Inventors: Takanori Matsunaga, Tokyo (JP); Marcus Hiemer, Karlsruhe (DE)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 247 days.

(21) Appl. No.: 10/808,308

(22) Filed: Mar. 25, 2004

(65) Prior Publication Data

US 2005/0154513 A1    Jul. 14, 2005

(30) Foreign Application Priority Data

Jan. 14, 2004 (JP) .............................. 2004-007243

(51) Int. Cl.
G60G 17/016 (2006.01)
G60G 23/00 (2006.01)

(52) U.S. Cl. ..................... 701/38; 701/41; 701/72; 701/81; 303/146

(58) Field of Classification Search .................... 701/1, 701/36–41, 70–72, 80–82; 303/146–150; 702/148–150
See application file for complete search history.

(56) References Cited

U.S. PATENT DOCUMENTS

| | | | | |
|---|---|---|---|---|
| 3,980,118 | A | | 9/1976 | Kinas ........................ 152/209.1 |
| 5,548,536 | A | * | 8/1996 | Ammon ........................ 702/148 |
| 5,557,520 | A | * | 9/1996 | Suissa et al. .................. 701/29 |
| 6,223,114 | B1 | * | 4/2001 | Boros et al. .................. 701/70 |
| 6,449,542 | B1 | * | 9/2002 | Bottiger et al. ............... 701/41 |
| 6,549,842 | B1 | * | 4/2003 | Hac et al. ..................... 701/80 |
| 6,648,426 | B1 | * | 11/2003 | Boettiger et al. ........... 303/146 |
| 6,754,615 | B1 | * | 6/2004 | Germann et al. .............. 703/8 |
| 6,909,957 | B2 | * | 6/2005 | Suissa ........................ 701/82 |

FOREIGN PATENT DOCUMENTS

| | | |
|---|---|---|
| DE | 42 16 301 C2 | 11/1993 |
| DE | 198 12 237 C1 | 9/1999 |
| DE | 198 51 978 A1 | 5/2000 |

* cited by examiner

Primary Examiner—Gertrude A. Jeanglaude
(74) Attorney, Agent, or Firm—Sughrue Mion, PLLC

(57) ABSTRACT

A vehicle dynamics behavior reproduction system capable of describing accurately behavior of a motor vehicle in a lateral direction even for nonlinear driving situation includes a vertical wheel force arithmetic module (105), a lateral wheel force arithmetic module (110), a cornering stiffness adaptation module (115), a state space model/observer unit (120), a selector (130), a delay module (135), and a tire side slip angle arithmetic module (125). Vertical wheel forces ($FZ_{ij}$) and tire side slip angles ($\alpha_{ij}$) are determined by using sensor information and estimated values while lateral wheel forces ($FY_{ij}$) are determined in accordance with a relatively simple nonlinear approximation equation. The lateral wheel force ($FY_{ij}$) and the tire side slip angle ($\alpha_{ij}$) provide bases for adaptation of cornering stiffnesses at individual wheels. Vehicle motion is accurately described to a marginal stability by using adapted cornering stiffnesses ($C_{ij}$) and other information.

16 Claims, 3 Drawing Sheets

VEHICLE DYNAMICS BEHAVIOR REPRODUCTION SYSTEM

BACKGROUND OF THE INVENTION

1. Field of the Invention

The present invention generally relates to a system for reproducing dynamics behavior of an automobile or motor vehicle, i.e., vehicle dynamics behavior reproduction system which is designed for improving the accuracy of analysis of the dynamics behavior of the motor vehicle by taking into consideration the driving situation to thereby improve the accuracy of analysis of a premonitory sign of e.g. traffic accident. More particularly, the present invention is concerned with the vehicle dynamics behavior reproduction system which is capable of describing the dynamics behavior of the motor vehicle with high accuracy up to a critical or marginal stability (limit of stability) by adapting the cornering stiffnesses at individual wheels of the motor vehicle to the driving situations.

2. Description of Related Art

In recent years, there has been an increasing trend of using a vehicle model with a view to improving the system for controlling the motion of the motor vehicle.

The vehicle model is a system to describe the behavior of the motor vehicle from a standpoint of the motor vehicle dynamics (i.e., the vehicle dynamics behavior in short). In this connection, it is noted that technologies of high level have been proposed for setting up a nonlinear state space model and a nonlinear state observer among others. For more particulars of these technologies, reference may have to be made to e.g. U. Kiencke and L. Nielsen: "AUTOMOTIVE CONTROL SYSTEMS", Springer-Verlag, Berlin, Heidelberg, New York, 2000. Hereinafter, this publication will be referred to as the literature [1].

In the conventional system based on the vehicle behavior dynamics, the vehicle behavior is described primarily with a linear one track vehicle model while neglecting rolling and pitching of the vehicle. In this conjunction, reference may have to be made to M. Mitschke: "DYNAMIK DER KRAFTFAHRZEUGE", Volume C of "FAHRVERHALTEN", Springer-Verlag, Berlin, Heidelberg, New York, 2nd Edition, 1990. Hereinafter, this publication will be referred to as the literature [2].

Further, as the simplified system known heretofore, there has also been proposed such a system in which a proportionality factor termed "cornering stiffness" is presumed in association with the relation between a side slip angle of tire (hereinafter also referred to as the tire side slip angle only for the convenience of description) and a side or lateral force acting on a wheel (hereinafter also referred to as the lateral wheel force). For more particulars, reference may have to be made to e.g. DE 198 12 237 C1 and DE 198 51 978 A1.

The vehicle dynamics behavior reproduction system for the simplified vehicle motion control system known heretofore suffers a problem that in the situation where the lateral acceleration of the motor vehicle is relatively high, behavior of the tire becomes nonlinear and thus the presumption of the linear (proportional) relation between the tire side slip angle and the lateral wheel force can no more be relied, incurring thus significant degradation in the reliability of the result of vehicle behavior reproduction, as a result of which description of the vehicle motion with the aid of the vehicle model is rendered invalid in the situation where the acceleration of the motor vehicle in the lateral direction is high (e.g. not lower than 4 m/s$^2$).

SUMMARY OF THE INVENTION

In the light of the state of the art described above, it is an object of the present invention to provide a vehicle dynamics behavior reproduction system which is capable of describing the vehicle motion up to a critical or marginal stability by arithmetically determining the lateral forces of the wheels in accordance with a relatively simple nonlinear approximation equation on the basis of various information derived actually from the outputs of on-vehicle sensors (i.e., sensors installed on the motor vehicle) as well as estimated values and by making use of adapted cornering stiffnesses at individual wheels together with other input information. The adapted cornering stiffnesses are made available by adapting the cornering stiffnesses to the driving situations of the motor vehicle on the basis of the calculated lateral wheel forces and the tire side slip angles.

In view of the above and other objects which will become apparent as the description proceeds, there is provided according to a general aspect of the present invention a vehicle dynamics behavior reproduction system for adapting the cornering stiffness to the driving situation of a motor vehicle in order to describe accurately the motion or behavior of the motor vehicle on the basis of various information derived from the outputs of the on-vehicle sensors without being influenced by the driving situation of the motor vehicle.

The vehicle dynamics behavior reproduction system mentioned above includes a vertical wheel force arithmetic means for arithmetically determining a load applied to each of the wheels of the motor vehicle as a vertical wheel force, a lateral wheel force arithmetic means for arithmetically determining a lateral force acting on each of the wheels (lateral wheel force), a cornering stiffness adaptation means for effectuating adaptation of the cornering stiffness at each of the wheels to the driving situation, a state space model/observer unit for determining solutions of simultaneous differential equations relating to a dynamics theory of the motor vehicle for calculating variables involved in the dynamics theory, a selector for selecting a specific signal as required from signals representing the above-mentioned solutions generated by the state space model/observer unit, a delay means for delaying the specific signal on a predetermined unitary time basis, and a tire side slip angle arithmetic means for arithmetically determining a tire side slip angle at each of the wheels in view of the driving situation.

The state space model/observer unit mentioned above includes a state space observer designed for determining variables which can not straightforwardly be measured.

With the structure of the vehicle dynamics behavior reproduction system described above, it is possible to describe the vehicle motion up to the marginal stability. Thus, the scope of application of the vehicle dynamics behavior reproduction system can remarkably be expanded. Namely, by determining the lateral forces of the wheels in accordance with the relatively simple nonlinear approximation equations which are easy to solve and adapting the cornering stiffnesses at the wheels to the driving situation by making use of the lateral forces of the wheels and the tire side slip angles at every calculation step to thereby make available the adapted cornering stiffnesses, the vehicle motion in the lateral direction can be described accurately even in the nonlinear driving situation, i.e., in the driving situation where nonlinear relation prevails between the tire side slip angle and the lateral wheel force.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
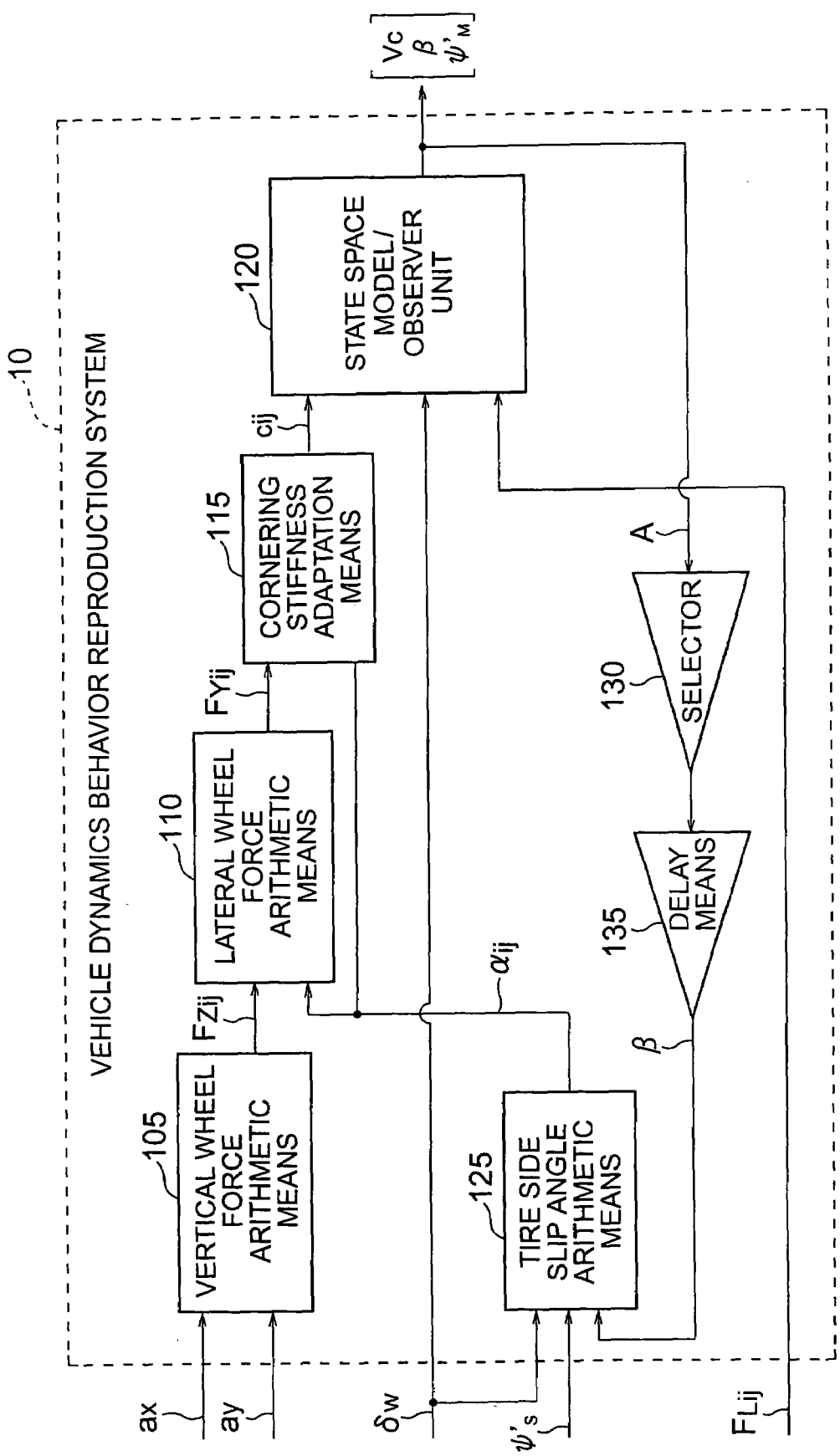
FIG. 1 is a block diagram showing schematically and generally a structure of a vehicle dynamics behavior reproduction system according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, referring to the drawings, description will be made in detail of the vehicle dynamics behavior reproduction system according to the first embodiment of the present invention. Incidentally, in the following description, suffix "ij" of variables representatively indicates positions of the individual wheels of the motor vehicle. By way of example, the suffix "ij" may be replaced by "FL" indicating a front left wheel of a motor vehicle, "FR" indicating a front right wheel, "RL" indicating a rear left wheel and "RR" indicating a rear right wheel, respectively.

Figure 2:
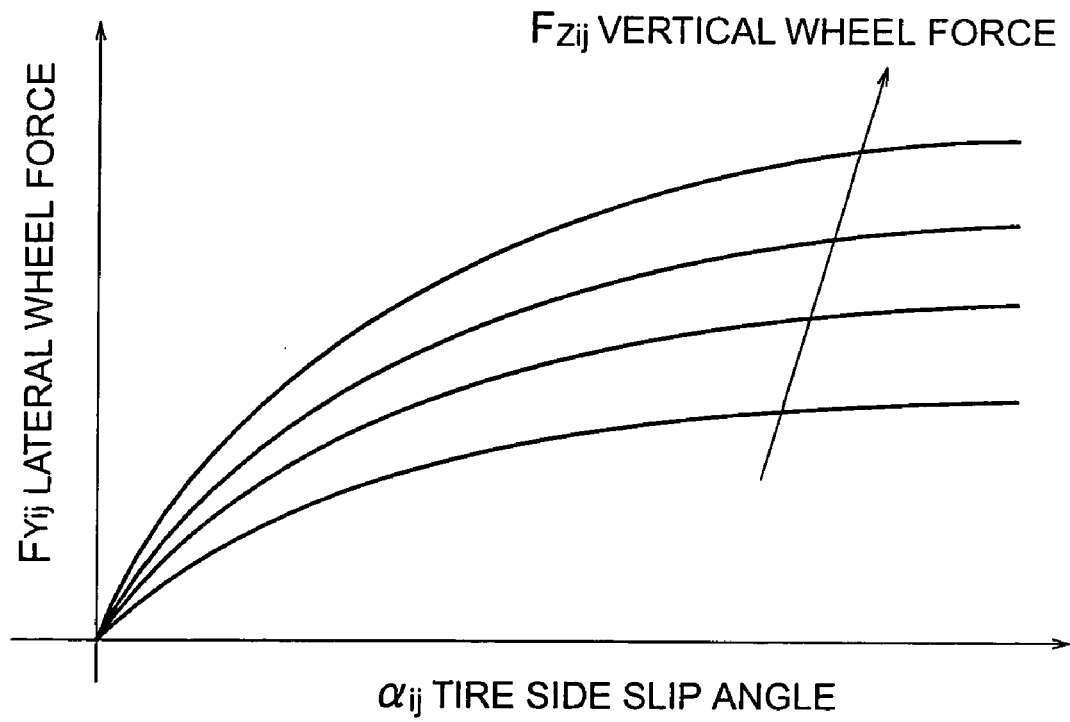
FIG. 2 is a view for graphically illustrating characteristics of lateral forces acting on wheels (lateral wheel forces) which bear dependency on tire side slip angles and wheel loads and which are taken into consideration in the system according to the first embodiment of the invention.
Figure 3:
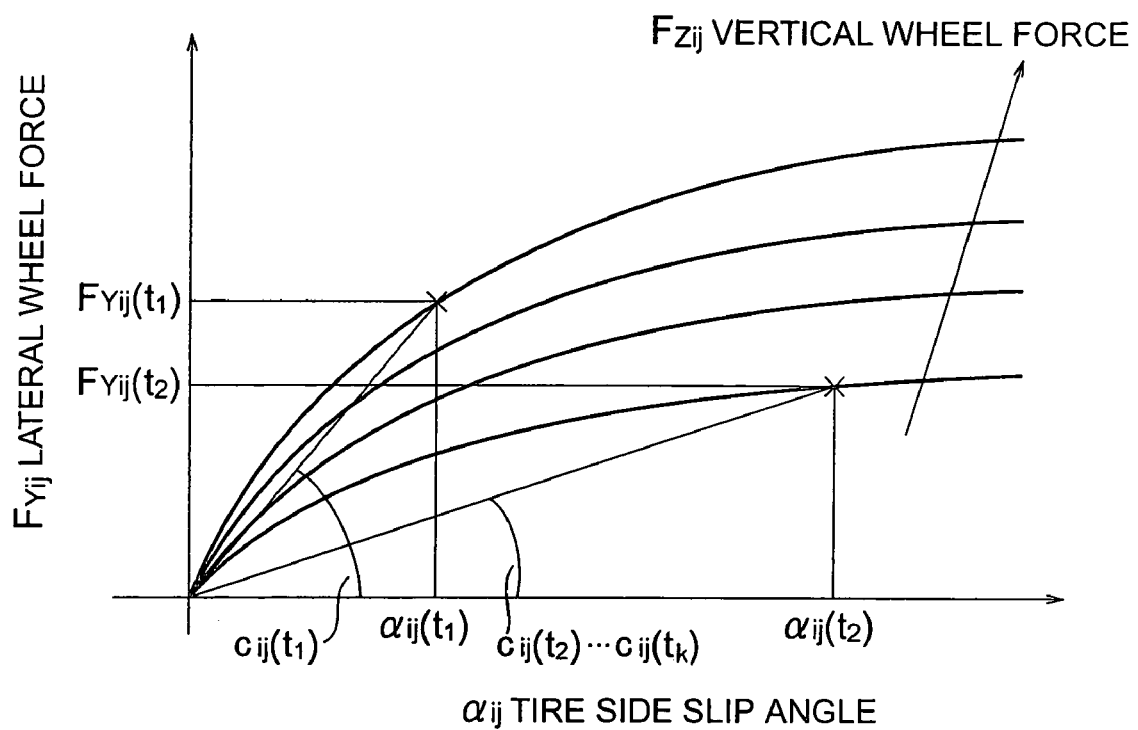
FIG. 3 is a view for graphically illustrating characteristics of the lateral wheel forces which bear dependency on the tire side slip angles and the wheel loads together with a process of executing adaptation of the cornering stiffnesses in the system according to the first embodiment of the invention.

In the drawings, FIG. 1 is a block diagram showing schematically and generally a structure of the vehicle dynamics behavior reproduction system according to the first embodiment of the present invention, FIG. 2 is a view for graphically illustrating the characteristics of lateral forces $F_{yij}$ acting on the wheels (also referred to as the lateral wheel forces) which bear dependency on tire side slip angles $\alpha_{ij}$ and vertical forces $F_{Zij}$ acting on the wheels, i.e., wheel loads (hereinafter also referred to as the vertical wheel forces) and FIG. 3 is a view for graphically illustrating characteristics of the lateral wheel forces $F_{yij}$ which bear dependency on the tire side slip angles $\alpha_{ij}$ and the vertical wheel forces $F_{Zij}$ together with a process of determining the adapted cornering stiffnesses $C_{ij}$.

Referring to FIG. 1, the vehicle dynamics behavior reproduction system 10 in which the adapted cornering stiffness $C_{ij}$ is used is realized in the form of algorithm which is executed by at least one microprocessor for improving the vehicle motion control system in view of the driving situation thereof.

As can be seen in FIG. 1, the vehicle dynamics behavior reproduction system 10 is comprised of a vertical wheel force arithmetic module or means 105 for arithmetically determining loads applied to the individual wheels of the motor vehicle as vertical wheel forces $F_{Zij}$, respectively, a lateral wheel force arithmetic module or means 110 for arithmetically determining the lateral wheel forces $F_{yij}$ acting on the individual wheels, respectively, a cornering stiffness adaptation means 115 for adapting the cornering stiffnesses of the individual wheels to thereby make available the adapted cornering stiffnesses $C_{ij}$, respectively, a state space model/observer unit 120 for arithmetically determining or calculating variables relating to the dynamics theory of the motor vehicle, a tire side slip angle arithmetic module or means 125 for arithmetically determining tire side slip angles (i.e., side slip angles of tire) $\alpha_{ij}$ of the individual wheels in view of the driving situation, a selector 130 for selecting a required specific signal (signal representing side slip angle of the vehicle body β from solution signals A generated by the state space model/observer unit 120, and a delay means 135 designed to delay processing of the vehicle body side slip angle β on a predetermined unitary time basis for inputting the delayed vehicle body side slip angle β to the tire side slip angle arithmetic means 125.

The state space model/observer unit 120 is composed of a state space model constituted by a set of differential equations for determining the solutions A of simultaneous differential equations relating to the dynamics theory as the state space vectors (three calculated values of the vehicle speed Vc, the vehicle body side slip angle β and a calculated yaw rate value $\psi'_M$, respectively) and a state space observer for determining the variables which can not straightforwardly be calculated.

The state space model of the state space model/observer unit 120 is so designed as to describe the dynamic behavior of the motor vehicle.

On the other hand, the state space observer of the state space model/observer unit 120 serves to adjust the parameters of the state space model so that deviation or difference between the calculated yaw rate value $\psi'_M$ and the detected yaw rate sensor value $\psi'_S$ becomes zero.

Thus, the state space model is constituted by the equations expressing an actual motor vehicle. Further, among the variables contained in the state space model (differential equations), the variable (the vehicle body side slip angle β in this case) which can not be measured because the corresponding sensor is not mounted on the motor vehicle can arithmetically be determined as the accurate value as well.

The individual input/output signals of the structural components (subsystems) incorporated in the vehicle dynamics behavior reproduction system 10 (i.e., the vertical wheel force arithmetic means 105, the lateral wheel force arithmetic means 110, the cornering stiffness adaptation means 115, the state space model/observer unit 120, the tire side slip angle arithmetic means 125, the selector 130 and the delay means 135) are indicated by arrows affixed to the lines interconnecting the individual structural components for making clear the processing procedures executed by the individual structural components, respectively.

Various information which can be derived from the outputs of the on-vehicle sensors not shown (i.e., detected values of acceleration ay in the lateral direction, acceleration ax in the longitudinal direction, wheel turn angle δw and detected yaw rate sensor value $\psi'_S$) are inputted to the vehicle dynamics behavior reproduction system 10 in which the adapted cornering stiffnesses $C_{ij}$ are available.

Upon calculation of the vertical wheel forces $F_{Zij}$ of the wheels, the vertical wheel force arithmetic means 105 takes into consideration changes of the individual wheel loads (vertical wheel forces) $F_{Zij}$ in dependence on the driving situations by fetching the acceleration ay in the lateral direction and the acceleration ax in the longitudinal direction as the input information.

By way of example, in the state where emergency brake has been applied, the vertical wheel forces $F_{Zij}$ acting on the wheels mounted on a front axle increase under the influence of load shift, while in the turning operation, the vertical wheel forces $F_{Zij}$ acting on the wheels running on the outer track become greater than those acting on the wheels running on the inner track under the influence of the centrifugal force.

A set of the vertical wheel forces $F_{Zij}$ calculated or arithmetically determined in correspondence to the various driving states are outputted from the vertical wheel force arithmetic means 105.

Incidentally, the equations for arithmetically determining the vertical wheel forces $F_{Zij}$ acting on the wheels can be derived on the basis of, for example, the equations concerning the torque balance, as is disclosed in the literature [1] cited hereinbefore.

The tire side slip angle arithmetic means 125 is programmed or designed to process the wheel turn angles δw of the wheels, the yaw rate $\psi'_S$ and the vehicle body side slip angle β.

The vehicle body side slip angle β is observed in the state space model/observer unit 120 and subsequently selected by the selector 130 to be outputted through the delay means 135.

Parenthetically, the fundamental equations based on a two-wheel model which are used by the tire side slip angle arithmetic means 125 are also described in the literature [1] mentioned above.

The delay means 135 is designed to delay the observed value of the vehicle body side slip angle β for a first time step (on a predetermined unitary time basis). The delayed observed value is then inputted to the tire side slip angle arithmetic means 125.

Since the first observed value of the vehicle body side slip angle β is not validated by the delay means 135 till a second time step (succeeding predetermined unitary time) for measurement, a proper initial value of the vehicle body side slip angle β at a time point $t_1$ (first predetermined unitary time) is set at the tire side slip angle arithmetic means 125.

The tire side slip angle arithmetic means 125 is designed to arithmetically determine the tire side slip angles $\alpha_{ij}$ of the individual wheels by fetching the sensor information (i.e., the turn angles δw of the wheels and the yaw rate $\psi'_S$) as the input information and the vehicle body side slip angle β as the feedback information. These tire side slip angles $\alpha_{ij}$ are then supplied to the lateral wheel force arithmetic means 110 and the cornering stiffness adaptation means 115 as the input information.

The lateral wheel force arithmetic means 110 is so programmed or designed as to arithmetically determine or calculate the lateral wheel forces $F_{Yij}$ on the basis of the input information of the vertical wheel forces $F_{Zij}$ and the tire side slip angles $\alpha_{ij}$ which depend on the loads of the individual wheels, respectively.

The lateral wheel forces $F_{Yij}$ are outputted from the lateral wheel force arithmetic means 110 to be inputted to the cornering stiffness adaptation means 115.

Incidentally, the lateral wheel forces $F_{Yij}$ are calculated in accordance with nonlinear approximation equations, which will be described later on in more detail by reference to FIG. 2.

The cornering stiffness adaptation means 115 is designed to arithmetically determine or calculate the adapted cornering stiffnesses $C_{ij}$ at every time point $t_k$ (k=1–N) on the basis of the input information of the plural lateral wheel forces $F_{Yij}$ and the plural tire side slip angles $\alpha_{ij}$. The adapted cornering stiffnesses $C_{ij}$ as determined are outputted from the cornering stiffness adaptation means 115.

Incidentally, the method of arithmetically determining the cornering stiffnesses as well as the cornering stiffness adaptation process will be described later on in more detail by reference to FIG. 3.

The state space model/observer unit 120 is designed to process the input information concerning the adapted cornering stiffnesses $C_{ij}$, the wheel turn angle δw fetched from the output of the steering sensor and the longitudinal wheel forces $F_{Lij}$ of the individual wheels determined on the basis of the engine torque (usually estimated in the engine control unit) to thereby output the solution signals A each containing the vehicle body side slip angle β.

The state space model included in the state space model/observer unit 120 is mainly constituted by a set of differential equations for determining the solutions A (the vehicle speed Vc, the vehicle body side slip angle β and the yaw rate value $\psi'_M$).

The vehicle body side slip angle β is a key variable playing an indispensably important role in the vehicle dynamics theory. However, the straightforward detection or measurement of the vehicle body side slip angle β requires a very expensive measuring instrument not applicable for a standard vehicle. Under the circumstances, in the vehicle dynamics behavior reproduction system shown in FIG. 1, the vehicle body side slip angle β is arithmetically determined by using the state space observer included in the state space model/observer unit 120 in order to evade the high expensiveness involved in the measurement of the vehicle body side slip angle β.

By the way, designing of the state space observer is familiar for those skilled in the control theory or technology. Further, the setup of the nonlinear state space model and the nonlinear state observer are described in detail in the literature [1] cited hereinbefore.

The state space model/observer unit 120 outputs the vehicle velocity Vc, the vehicle body side slip angle β and the yaw rate $\psi'_M$ as the solutions A in the form of solution signals also designated by reference character "A".

Further, the output values of the state space model/observer unit 120 are also outputted to external equipment as the results of the processing executed by the vehicle dynamics behavior reproduction system 10 by making use of the adapted cornering stiffnesses $C_{ij}$.

The selector 130 serves for selecting the vehicle body side slip angle β from the output values of the state space model/observer unit 120. The selected vehicle body side slip angle β is then delayed through the delay means 135 to be finally fed back to the tire side slip angle arithmetic means 125.

Next, description will turn to the principle of deriving the adapted cornering stiffness $C_{ij}$ in the vehicle dynamics behavior reproduction system according to the first embodiment of the present invention by referring to FIG. 2 which graphically illustrates the characteristics of the lateral wheel forces $F_{Yij}$.

The characteristic curves shown in FIG. 2 manifest that the fundamental equations are realized by the lateral wheel force arithmetic means 110 of the vehicle dynamics behavior reproduction system shown in FIG. 1.

As is apparent from the characteristic curves shown in FIG. 2, the individual lateral wheel forces $F_{Yij}$ which are arithmetically determined by the lateral wheel force arithmetic means 110 on the basis of the tire side slip angles $\alpha_{ij}$ and the vertical wheel forces $F_{Zij}$, respectively, bear nonlinear relations to the tire side slip angles $\alpha_{ij}$ and the wheel loads $F_{Zij}$, respectively.

The lateral wheel force $F_{Yij}$ is used as the basis for the adaptation of the cornering stiffness carried out by the cornering stiffness adaptation means 115.

More specifically, the lateral wheel force $F_{Yij}$ is calculated in accordance with the undermentioned approximating equation (1) by applying the nonlinear relation shown in FIG. 2.

$$F_{Yij} = \left[k_1 - \frac{F_{Zij}}{k_2}\right] \cdot F_{Zij} \cdot \arctan(k_3 \cdot \alpha_{ij}) \quad (1)$$

In the equation mentioned above, the parameters $k_1$, $k_2$ and $k_3$ are given as constants the values of which are selected in dependence on the specifications of the tire (s) mounted on the motor vehicle.

With the aid of the equation (1), it is possible to approximately determine the lateral wheel forces $F_{Yij}$ even in an extraordinary driving situation.

The lateral wheel forces $F_{Yij}$ are arithmetically determined by means of the lateral wheel force arithmetic means 110 in every simulation step.

The lateral wheel forces $F_{Yij}$ arithmetically determined by the lateral wheel force arithmetic means 110 on the basis of the vertical wheel forces $F_{Zij}$ and the tire side slip angles $\alpha_{ij}$, respectively, are inputted to the cornering stiffness adaptation means 115 together with the tire side slip angles $\alpha_{ij}$, respectively.

Next, referring to FIG. 3, description will be made of the underlying or fundamental equations realized by the cornering stiffness adaptation means 115.

Referring to FIG. 3, paired values of the lateral wheel force $F_{Yij}(t_k)$ and the tire side slip angle $\alpha_{ij}(t_k)$ acquired at each time point $t_k$ are processed in accordance with the undermentioned equation for determining the adapted cornering stiffness $C_{ij}(t)$ at each time point $t_k$:

$$c_{ij}(t_k) = \frac{F_{Yij}(t_k)}{\alpha_{ij}(t_k)}, \text{ if } \alpha_{ij}(t_k) \neq 0 \quad (2)$$

$$c_{ij}(t_k) = \text{const.}, \text{ if } \alpha_{ij}(t_k) = 0$$

The above-mentioned equation (2) means that the updated value of the adapted cornering stiffness $C_{ij}(t_k)$ is arithmetically determined at every time point $t_k$ in dependence on the driving situations prevailing at these time points, respectively.

By using the adapted cornering stiffness $c_{ij}$ arithmetically determined in this manner, it is possible to adopt the linear approximations of the nonlinear curves in the state space model/observer unit 120.

As is apparent from the foregoing, the vehicle dynamics behavior reproduction system 10 according to the embodiment of the present invention is comprised of the cornering stiffness adaptation means 115 for effectuating adaptation of the cornering stiffnesses at the individual wheels to the prevailing driving situation by making use of the tire side slip angles $\alpha_{ij}$ and the lateral wheel forces $F_{Yij}$ of the wheels, the state space model/observer unit 120 including the state space observer for determining the solutions A of the simultaneous differential equations to calculate the key variable (vehicle body side slip angle $\beta$) playing the important role in the vehicle dynamics theory, the selector 130 for selecting the specific signal (vehicle body side slip angle $\beta$), the delay means 135 for delaying the specific signal on a predetermined unitary time basis, and the tire side slip angle arithmetic means 125 for arithmetically determining the tire side slip angle $\alpha_{ij}$ of each wheel on the basis of the various information derived from the outputs of the on-vehicle sensors (the wheel turn angle $\delta w$ and the yaw rate $\psi'_S$) and the vehicle body side slip angle $\beta$ outputted from the state space model/observer unit 120 inputted as the fed-back information.

More specifically, in the vehicle dynamics behavior reproduction system according to the invention, the vertical wheel force arithmetic means 105 calculates the effective vertical wheel force $F_{Zij}(t_k)$ at the time point $t_k$ on the basis of the accelerations ay and ax in the lateral and longitudinal directions, respectively, which are derived from the outputs of the respective acceleration sensors with a view to taking into consideration the change of the wheel-load-dependent vertical wheel force $F_{Zij}$ as a function of the time. On the other hand, the tire side slip angle arithmetic means 125 calculates the tire side slip angle $\alpha_{ij}(t_k)$ at the time point $t_k$. The calculated tire side slip angle $\alpha_{ij}(t_k)$ is inputted to the lateral wheel force arithmetic means 110 together with the calculated vertical wheel force $F_{Zij}(t_k)$.

The lateral wheel force $F_{Yij}$ arithmetically determined by the lateral wheel force arithmetic means 110 is inputted to the cornering stiffness adaptation means 115 together with the tire side slip angle $\alpha_{ij}(t_k)$. In response, the cornering stiffness adaptation means 115 executes the adaptation processing to output the adapted cornering stiffness $C_{ij}(t_k)$.

The wheel turn angle $\delta w$, the longitudinal wheel force $F_{Lij}(t_k)$ and the adapted cornering stiffness $C_{ij}(t_k)$ are inputted to the state space model held internally of the state space model/observer unit 120. The solution signals A generated from the state space model are inputted to the selector 130 and at the same time supplied to the external equipment as the output signal of the vehicle dynamics behavior reproduction system 10.

The selector 130 selects the signal representing the vehicle body side slip angle $\beta$ from the solution signals A. The selected vehicle body side slip angle $\beta$ is fed back to the tire side slip angle arithmetic means 125 as the input thereto after having been delayed on a predetermined unitary time basis at the time point ($t_k$) by means of the delay means 135.

In the vehicle dynamics behavior reproduction system 10, the lateral wheel forces $F_{Yij}$ of the wheels are firstly determined through the approximation arithmetic performed by the lateral wheel force arithmetic means 110 in accordance with the nonlinear approximation equation (1) which is simple and easy to solve on the basis of the various sensor information (i.e., the accelerations ay and ax in the lateral and longitudinal directions, respectively, the wheel turn angle $\delta w$, the yaw rate $\psi'_S$, and the longitudinal wheel force $F_{Lij}$) as inputted as well as the vehicle body side slip angle $\beta$ supplied as the feedback information.

In succession, the processing for adaptation of the cornering stiffnesses at the individual wheels is executed by the cornering stiffness adaptation means 115 in accordance with the adaptation equation (2) on the basis of the lateral wheel forces $F_{Yij}$ and the tire side slip angles $\alpha_{ij}$, respectively, in every calculation step (on a predetermined unitary time basis) in view of the prevailing driving situation, whereby the adapted cornering stiffnesses $C_{ij}$ are generated.

Thus, the vehicle motion in the lateral direction can accurately be described even for the nonlinear driving situation. In this conjunction, it should be added that the nonlinear driving situation is recognized as the abnormal state by average drivers because the motor vehicle does not react expectedly for the steering operation of the driver.

With the vehicle dynamics behavior reproduction system according to the first embodiment of the present invention, typical improper operation behavior of the motor vehicle which takes place frequently as the premonitory sign of traffic accident can precisely be described.

Further, the vehicle dynamics behavior reproduction system 10 can ensure high accuracy owing to the nonlinear procedure in which the functions of the state space model are made use of. Thus, the description with the state space model is very useful for application to the control because the design theory of perfect control apparatus is available.

Furthermore, with the vehicle dynamics behavior reproduction system 10 shown in FIG. 1, it is possible to describe the vehicle motion up to the marginal stability (limit of stability). For this reason, the scope of applications of the vehicle dynamics behavior reproduction system can significantly be expanded as compared with the conventional systems known heretofore.

Many modifications and variations of the present invention are possible in the light of the above techniques. It is therefore to be understood that within the scope of the appended claims, the invention may be practiced otherwise than as specifically described.

What is claimed is:

1. A vehicle dynamics behavior reproduction system for adapting cornering stiffness to driving situation of a motor vehicle in order to describe accurately behavior of the motor vehicle on the basis of various information derived from outputs of on-vehicle sensors without being influenced by said driving situation of the motor vehicle, comprising:
    vertical wheel force arithmetic means for arithmetically determining a load applied to each of wheels of said motor vehicle as a vertical wheel force;
    lateral wheel force arithmetic means for arithmetically determining a lateral wheel force acting on each of said wheels;
    cornering stiffness adaptation means for effectuating adaptation of the cornering stiffness at each of said wheels to said driving situation;
    a state space model/observer unit for determining solutions of simultaneous differential equations relating to a dynamics theory of the motor vehicle for calculating variables involved in said dynamics theory;
    a selector for selecting a specific signal as required from signals representing said solutions generated by said state space model/observer unit;
    delay means for delaying said specific signal on a predetermined unitary time basis; and
    tire side slip angle arithmetic means for arithmetically determining a tire side slip angle at each of said wheels in view of said driving situation,
    wherein said state space model/observer unit includes a state space observer designed for determining variables which can not straightforwardly be measured.

2. A vehicle dynamics behavior reproduction system according to claim 1, wherein said lateral wheel force arithmetic means is designed to approximate the lateral force $F_Y$ at each of said wheels in accordance with $$F_{Yij} = \left[ k_1 - \frac{F_{Zij}}{k_2} \right] \cdot F_{Zij} \cdot \arctan(k_3 \cdot \alpha_{ij}) \quad (1)$$

where $F_Z$ represents said vertical wheel force,
$\alpha$ represents said tire side slip angle, and
$k_1$, $k_2$ and $k_3$ represent constant parameters specific to the tire.

3. A vehicle dynamics behavior reproduction system according to claim 1, wherein said cornering stiffness adaptation means is designed to effectuate adaptation of the cornering stiffnesses of the individual wheels, respectively, to the driving situation on a predetermined unitary time basis in accordance with an undermentioned adaptation equation:

$$c_{ij}(t_k) = \frac{F_{Yij}(t_k)}{\alpha_{ij}(t_k)}, \text{ if } \alpha_{ij}(t_k) \neq 0 \quad (2)$$

$$c_{ij}(t_k) = \text{const.}, \text{ if } \alpha_{ij}(t_k) = 0$$

where c(t) represents the adapted cornering stiffnesses at the wheels, respectively, at a time point t,
$F_Y(t)$ represents the lateral forces of the wheels, respectively, at the time point t,
$\alpha$ (t) represents the side slip angles of the tires, respectively, at the time point t, and where
const. represents a constant used to describe the cornering stiffness in linear vehicle model theory.

4. A vehicle dynamics behavior reproduction system according to claim 1, wherein:
    the state space model/observer unit comprises a state space model including the differential equations relating to the dynamics theory of the motor vehicle; and
    the state space model/observer unit adjusts the parameters of the state space model so that a difference between a calculated yaw rate value and a detected yaw rate sensor value becomes zero.

5. A vehicle dynamics behavior reproduction system according to claim 1, wherein:
    the state space model/observer unit comprises a state space model including the differential equations relating to the dynamics theory of the motor vehicle;
    the state space model determines the solutions of the differential equations relating to the dynamics theory of the motor vehicle as state space vectors; and
    the state space vectors comprise values for vehicle speed, vehicle body side slip angle and a calculated yaw rate value.

6. A vehicle dynamics behavior reproduction system according to claim 1, wherein the specific signal is a vehicle body side slip angle.

7. A vehicle dynamics behavior reproduction system according to claim 1, wherein the variables which can not straightforwardly be measured include a vehicle body side slip angle.

8. A vehicle dynamics behavior reproduction system according to claim 7, wherein the specific signal is also the vehicle body side slip angle.

9. A vehicle dynamics behavior reproduction system for adapting cornering stiffness to driving situation of a motor vehicle in order to describe accurately behavior of the motor vehicle on the basis of various information derived from outputs of on-vehicle sensors without being influenced by said driving situation of the motor vehicle, comprising:
- a vertical wheel force arithmetic module that arithmetically determines a load applied to each of wheels of said motor vehicle as a vertical wheel force;
- a lateral wheel force arithmetic module that arithmetically determines a lateral wheel force acting on each of said wheels;
- a cornering stiffness adaptation module that effectuates adaptation of the cornering stiffness at each of said wheels to said driving situation;
- a state space model/observer module that determines solutions of simultaneous differential equations relating to a dynamics theory of the motor vehicle for calculating variables involved in said dynamics theory;
- a selector module that selects a specific signal as required from signals representing said solutions generated by said state space model/observer module;
- a delay module that delays said specific signal on a predetermined unitary time basis; and
- a tire side slip angle arithmetic module that arithmetically determines a tire side slip angle at each of said wheels in view of said driving situation,
- wherein said state space model/observer module includes a state space observer designed for determining variables which can not straightforwardly be measured.

10. A vehicle dynamics behavior reproduction system according to claim 9, wherein said lateral wheel force arithmetic module is designed to approximate the lateral force $F_Y$ at each of said wheels in accordance with $$F_{Yij} = \left[k_1 - \frac{F_{Zij}}{k_2}\right] \cdot F_{Zij} \cdot \arctan(k_3 \cdot \alpha_{ij}) \qquad (1)$$

where $F_Z$ represents said vertical wheel force,
$\alpha$ represents said tire side slip angle, and
$k_1$, $k_2$ and $k_3$ represent constant parameters specific to the tire.

11. A vehicle dynamics behavior reproduction system according to claim 9, wherein said cornering stiffness adaptation module is designed to effectuate adaptation of the cornering stiffnesses of the individual wheels, respectively, to the driving situation on a predetermined unitary time basis in accordance with an undermentioned adaptation equation:

$$c_{ij}(t_k) = \frac{F_{Yij}(t_k)}{\alpha_{ij}(t_k)}, \text{ if } \alpha_{ij}(t_k) \neq 0 \qquad (2)$$

$$c_{ij}(t_k) = const., \text{ if } \alpha_{ij}(t_k) = 0$$

where c(t) represents the adapted cornering stiffnesses at the wheels, respectively, at a time point t,
$F_Y(t)$ represents the lateral forces of the wheels, respectively, at the time point t,
$\alpha$ (t) represents the side sup angles of the tires, respectively, at the time point t, and where
const. represents a constant used to describe the cornering stiffness in linear vehicle model theory.

12. A vehicle dynamics behavior reproduction system according to claim 9, wherein:
- the state space model/observer module comprises a state space model including the differential equations relating to the dynamics theory of the motor vehicle; and
- the state space model/observer module adjusts the parameters of the state space model so that a difference between a calculated yaw rate value and a detected yaw rate sensor value becomes zero.

13. A vehicle dynamics behavior reproduction system according to claim 9, wherein:
- the state space model/observer module comprises a state space model including the differential equations relating to the dynamics theory of the motor vehicle;
- the state space model determines the solutions of the differential equations relating to the dynamics theory of the motor vehicle as state space vectors; and
- the state space vectors comprise values for vehicle speed, vehicle body side slip angle and a calculated yaw rate value.

14. A vehicle dynamics behavior reproduction system according to claim 9, wherein the specific signal is a vehicle body side slip angle.

15. A vehicle dynamics behavior reproduction system according to claim 9, wherein the variables which can not straightforwardly be measured include a vehicle body side slip angle.

16. A vehicle dynamics behavior reproduction system according to claim 15, wherein the specific signal is also the vehicle body side slip angle.

* * * * *